United States Patent [19]

Easterling

[11] Patent Number: 4,698,119
[45] Date of Patent: Oct. 6, 1987

[54] APPARATUS FOR SPLICING MAGNETIC TAPE

[76] Inventor: Teddy G. Easterling, Box 1822, Rancho Santa Fe, Calif. 92067

[21] Appl. No.: 415,562

[22] Filed: Sep. 10, 1982

[51] Int. Cl.$^4$ .................. B31F 5/06; G03D 15/04
[52] U.S. Cl. .................................. 156/506; 40/502
[58] Field of Search ............ 156/502, 505, 506; 206/387, 486, 352, 376, 349, 568, 570, 574, 575, 581, 582, 228, 488; 242/58.1, 58.5

[56] References Cited

U.S. PATENT DOCUMENTS

| | | | |
|---|---|---|---|
| 2,552,148 | 5/1951 | Carson | 156/505 |
| 3,717,535 | 2/1973 | Jorgensen | 156/506 |
| 3,822,781 | 7/1974 | Braginetz | 206/228 |
| 3,833,447 | 9/1974 | Gustafson | 156/505 |
| 4,082,600 | 4/1978 | Hanke | 156/505 |
| 4,174,247 | 11/1979 | Dyck | 156/506 |

*Primary Examiner*—Donald E. Czaja
*Assistant Examiner*—Merrell C. Cashion, Jr.
*Attorney, Agent, or Firm*—Baker, Maxham & Jester

[57] ABSTRACT

A base is provided for horizontally supporting a magnetic tape cassette with its tape access door held open. Magnetic tape from the cassette is threaded around a plurality of removable guide posts and is held horizontally within an elongate recess by a pair of hingedly mounted clasps. A groove extends diagonally across the recess for permitting a cutting implement to slice through the length of tape aligned in the recess. Wrinkled segments of tape are removed by feeding the tape to the appropriate location in the recess, closing the clasps and making the necessary cuts. The cut ends of the good tape are then abutted in alignment within the recess. A splicing key guided by detents in the base is used to affix the adhesive layer of a splicing tab over the abutting cut ends to thereby splice the tape together. The base is formed with a plurality of receptacles for holding accessories such as the removable guide posts, a screwdriver, a pair of scissors, and a knob for rotating the reels of the tape cassette. When a cassette is not mounted on the base and the accessories are stored in their corresponding receptacles, a clear cover fits over the base to retain the accessories and thereby provide a readily storable splicing kit.

19 Claims, 12 Drawing Figures

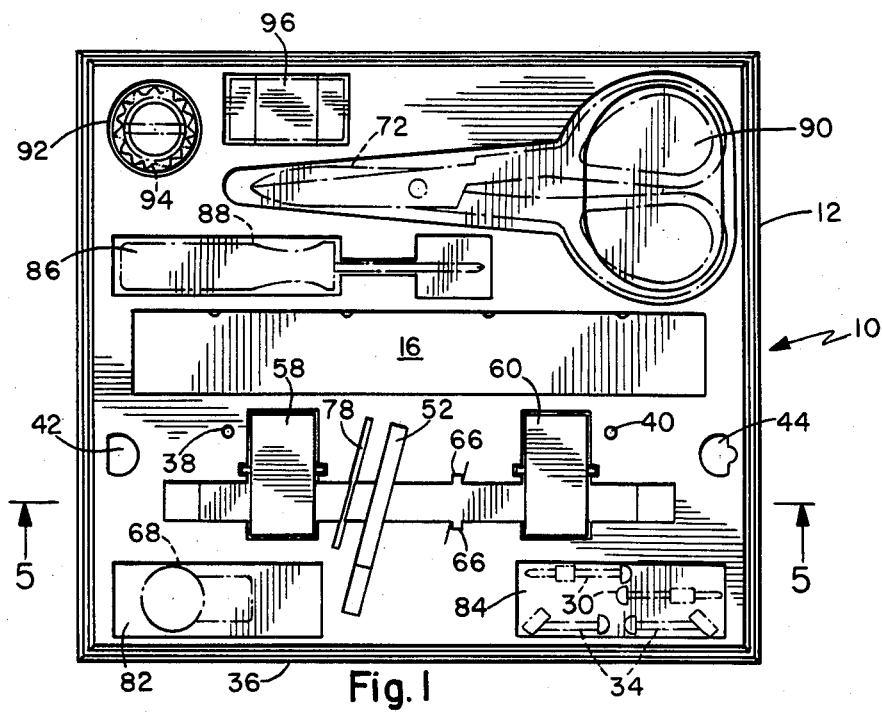
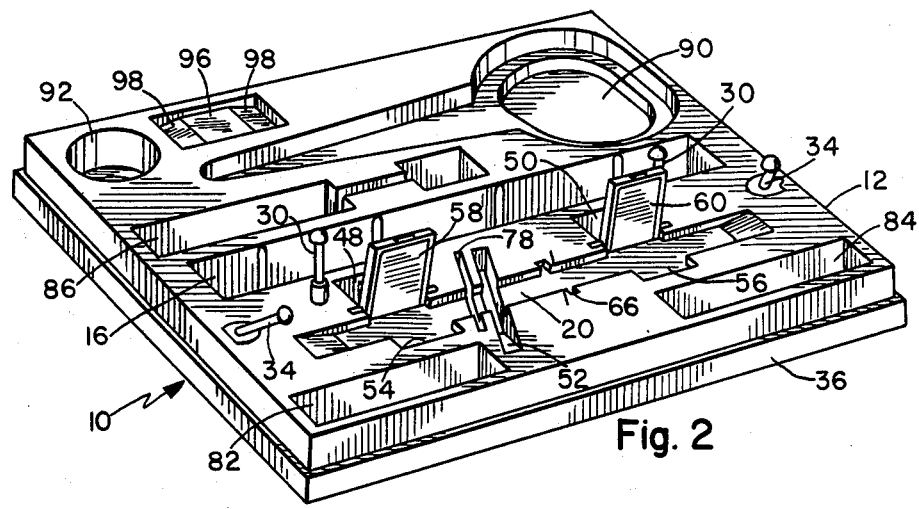
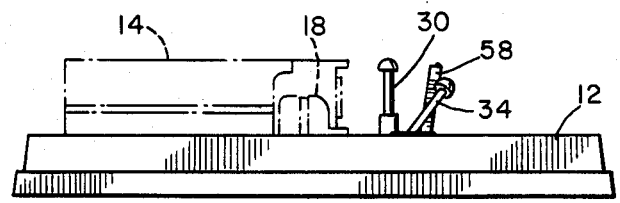

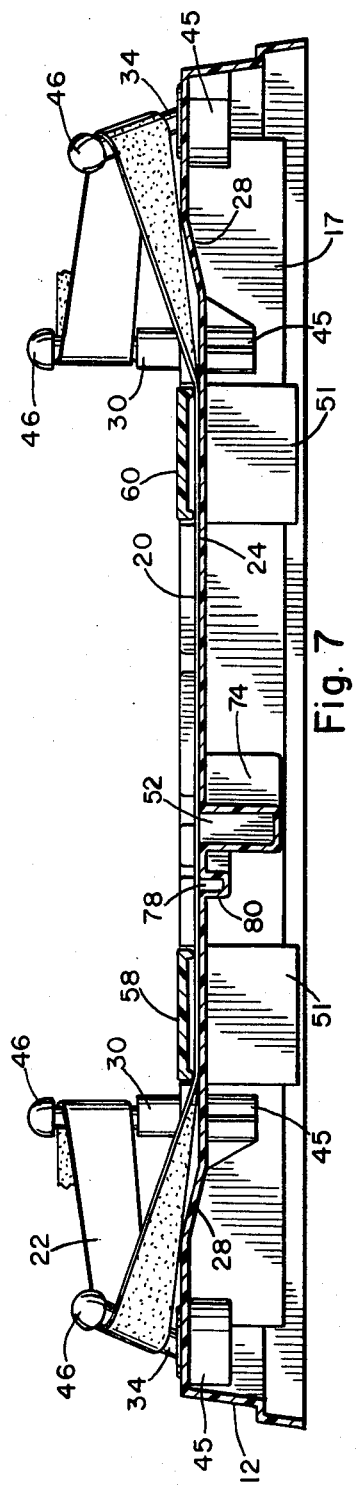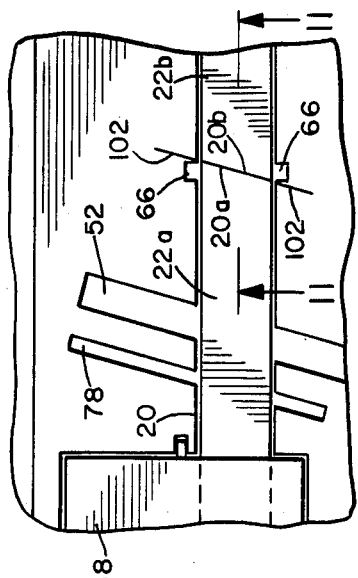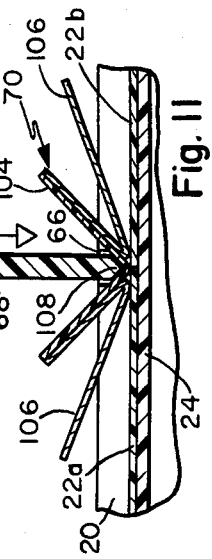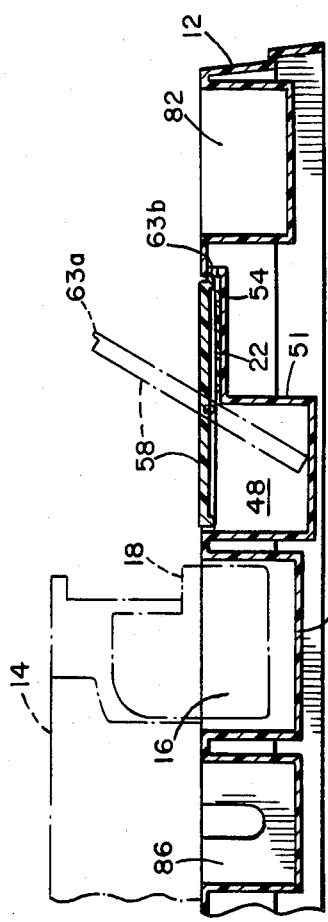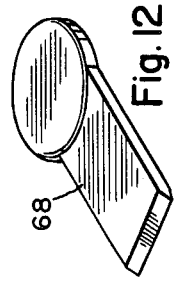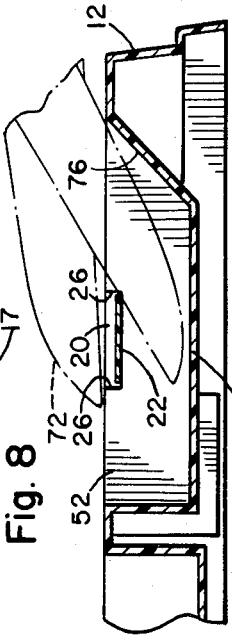

APPARATUS FOR SPLICING MAGNETIC TAPE

BACKGROUND OF THE INVENTION

The present invention relates to splicing apparatus, and more particularly, to an apparatus which may be utilized to repair damaged magnetic tape in a video cassette.

A typical video cassette comprises a length of magnetic tape wound between a pair of reels rotatably supported inside a rectangular case. The case has a spring biased door along one side edge which swings open when the cassette is inserted into a video recorder. This exposes a segment of the tape which extends between the reels for engagement by a magnetic head. The recorder drives the reels to propel the tape past the head. Electronic circuitry within the recorder either magnetically encodes program information on the tape or reads program information from the tape for display on a television set connected to the recorder.

Occassionally, mechanical malfunctions in the cassette or in the drive mechanisms of the video recorder can cause the tape to break or to be mutilated. In such cases, in order to save the cassette, it is necessary to splice the tape. This requires that any wrinkled portions be removed and that the two cut ends be rejoined. The ends must be rejoined in proper alignment in order to insure proper feeding of the tape through the video recorder when the cassette is reused. This requires that the two ends be joined in a straight line. Furthermore, the end edges should abut one another. Splicing tabs are commercially available forjoining the ends. They consist of an adhesive sheet having the same width as the magnetic tape and having a pair of folded backing sheets which may be peeled away to facilitate adhering the adhesive sheet to the tape.

Splicing the magnetic tape of a video cassette manually can be a tedious job. First of all, the spring biased door of the cassette must be held back in some manner to expose the segment of the tape which extends between the reels. Next, the tape must be grasped and pulled from the feed openings of the cassette. If the tape is not broken, but has a mutilated segment over which a considerable length of good tape has been wound, then it may be necessary to pull a large amount of tape from the cassette. In order to prevent the good tape which is pulled from the cassette from being damaged or being in the way, it must be rewound on the other reel. This may require the user to insert a pencil or other implement into one of the hubs of the cassette so that that reel can be wound to take up the slack.

In the case of a broken tape, or a tape having a wrinkled segment, the tape must be cut in two locations. This is typically done using a pair of scissors. Tape is usually spliced at an angle so the cuts must be made at an angle. If the angles of the two cuts are not exactly the same, then the ends of the tape cannot be precisely abutted. The resulting gap between the tape ends when the tape is adhesively joined leads to a loss in program information during recording and a resulting noise during playback. Once the two cuts have been manually made, the two ends of the tape must be aligned in a straight line and held in this position so that the splicing tab can be applied to join the ends. This can be a difficult and exasperating problem when attempted manually.

Another problem which arises in manually splicing magnetic tape of a video cassette is that the adhesive sheet of the splicing tab should be adhered to the nonrecording side of the tape. This can be overlooked by a person during the manual repair process. When the adhesive sheet is on the recording side of the tape, there is a loss of program information during recording, and a resulting loss of signal during playback.

In the past, a wide variety of apparatus have been provided for splicing motion picture film, magnetic tape and other reel wound webs. Such apparatus have included motor or manually driven feed and take-up reels as well as tracks to guide the tape and clamp the ends in position for splicing. However, the inventor is not aware of any splicing apparatus which has been developed in the past which is specifically adapted for splicing magnetic tape in video cassettes.

SUMMARY OF THE INVENTION

Accordingly, it is the primary object of the present invention to provide an apparatus for splicing magnetic tape wound between a pair of reels in a cassette.

Another object of the present invention is to provide such an apparatus which has a simple, durable construction and has no automated components.

Still another object of the present invention is to provide such an apparatus which is particularly adapted for home repair of video cassettes.

Another object of the present invention is to provide such an apparatus whose principal component may be molded from a single, unitary piece of plastic.

Yet another object of the present invention is to provide such an apparatus which has receptacles for convenient storage of splicing tabs, a screwdriver, and different cutting implements.

Still another object of the present invention is to provide such an apparatus with a simple design so that its use is straightforward.

Accordingly, the present invention provides a base for horizontally supporting a magnetic tape cassette with its tape access door held open. Magnetic tape from the cassette is threaded around a plurality of removable guide posts and is held horizontally within an elongate recess by a pair of hingedly mounted clasps. A groove extends diagonally across the recess for permitting a cutting implement to slice through the length of tape aligned in the recess. Wrinkled segments of tape are removed by feeding the tape to the appropriate location in the recess, closing the clasps and making the necessary cuts. The cut ends of the good tape are then abutted in alignment within the recess. A splicing key guided by detents in the base is used to affix the adhesive layer of a splicing tab over the abutting cut ends to thereby splice the tape together. The base is formed with a plurality of receptacles for holding accessories such as the removable guide posts, a screwdriver, a pair of scissors, and a knob for rotating the reels of the tape cassette. When a cassette is not mounted on the base and the accessories are stored in their corresponding receptacles, a clear cover fits over the base to retain the accessories and thereby provide a readily storable splicing kit.

BRIEF DESCRIPTION OF THE DRAWINGS

FIG. 1 is a top plan view of a preferred embodiment of my magnetic tape splicing apparatus with its accessories indicated in broken lines.

FIG. 2 is a perspective view of the preferred embodiment with the accessories removed and set up to receive a video cassette.

FIG. 3 is an end view of the preferred embodiment as set up in FIG. 2.

FIG. 7 is an enlarged sectional view of the preferred embodiment taken along line 7—7 of FIG. 4.

FIG. 8 is a sectional view of the preferred embodiment taken along line 8—8 of FIG. 6. The closed position of one of the tape clasps is shown in solid lines and the open position of the tape clasps is shown in broken lines.

FIG. 9 is a sectional view of the preferred embodiment taken along line 9—9 of FIG. 6. A pair of scissors are illustrated in broken lines cutting the tape held in the tape recess of the preferred embodiment.

FIG. 10 is a top plan view of a portion of the tape recess of the preferred embodiment with the tape positioned for splicing.

FIG. 11 is an enlarged sectional view taken along line 11-11 of FIG. 10 and illustrating the adhesive sheet of a splicing tab being attached to the tape with a splicing key.

FIG. 12 is a perspective view of the splicing key.

DESCRIPTION OF THE PREFERRED EMBODIMENT

Figure 4:
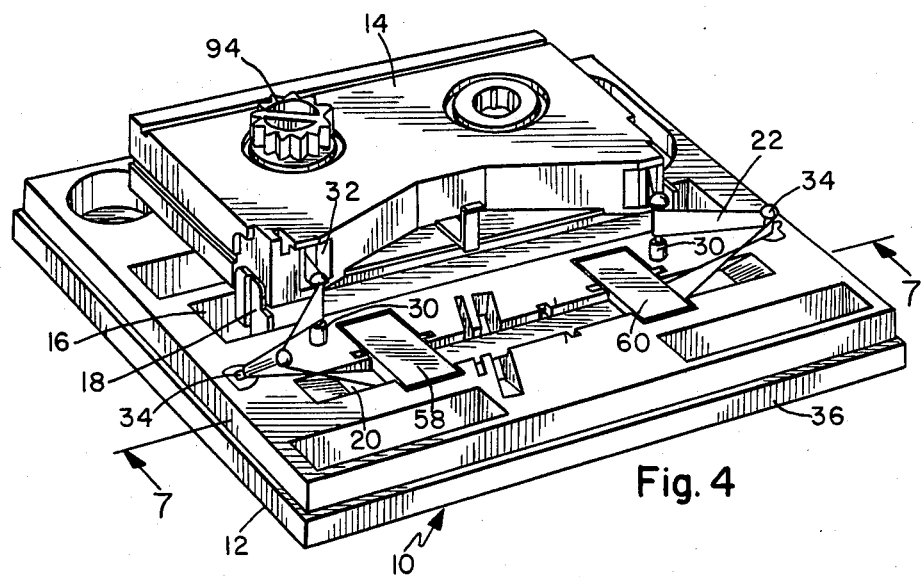
FIG. 4 is a perspective view of the preferred embodiment with a video cassette in place with its tape threaded through the apparatus and ready for cutting.

The preferred embodiment of my apparatus 10 (FIGS. 1 and 2) includes a rectangular base 12 for horizontally supporting a video cassette 14 (FIG. 4). The base is preferably a unitary piece of molded plastic. The base includes door retention means in the form of an upwardly opening, elongate channel 16 (FIG. 2) formed in the medial portion of the base. The channel is defined by a box-shaped projection 17 (FIG. 7) molded in the underside of the base. The channel is dimensioned for receiving and holding the cassette door 18 as illustrated in FIGS. 3, 4 and 8. This cassette door is normally spring biased to its closed position and may be manually opened by pressing a latch with a screwdriver or other pointed implement. The channel 16 is preferably long enough to accommodate the doors of different sizes of video cassettes.

The base 12 further includes a track means in the form of an upwardly opening, elongate recess 20 (FIG. 2). The recess is formed in the base and extends parallel to and spaced from the channel 16. The recess 20 is relatively shallow and has a width slightly greater than the width of the magnetic tape 22 (FIGS. 4 and 7) of the video cassette. As best seen in FIG. 7, the recess 20 has a flat bottom wall 24, a pair of straight side walls 26 (FIG. 9) and a pair of inclined end walls 28 (FIG. 7). As explained hereafter in greater detail, the magnetic tape 22 from the cassette 14 is threaded through the elongate recess 20. The recess is used to maintain the cut ends of the tape in proper alignment so that they may be joined with their ends abutting and with the two end segments extending straight relative to one another.

My apparatus further includes guide means on the base for feeding tape from one reel of the cassette through the recess and back to the other reel of the cassette. Referring to FIG. 2, a first pair of removable guide posts 30 each extend vertically from the base between the channel 16 and the recess 20 adjacent a tape feed opening 32 (FIG. 4) of the video cassette. A second pair of removable guide posts 34 (FIG. 2) each extend upwardly at an angle from the base toward a corresponding end of the tape recess 20. The second pair of guide posts are also positioned between the channel 16 and the tape recess 20. The location of the guide posts 30 and 34 on the base and their relative spacings are such that the tape can be fed from the feed openings of the cassette into and through the recess.

Figure 6:
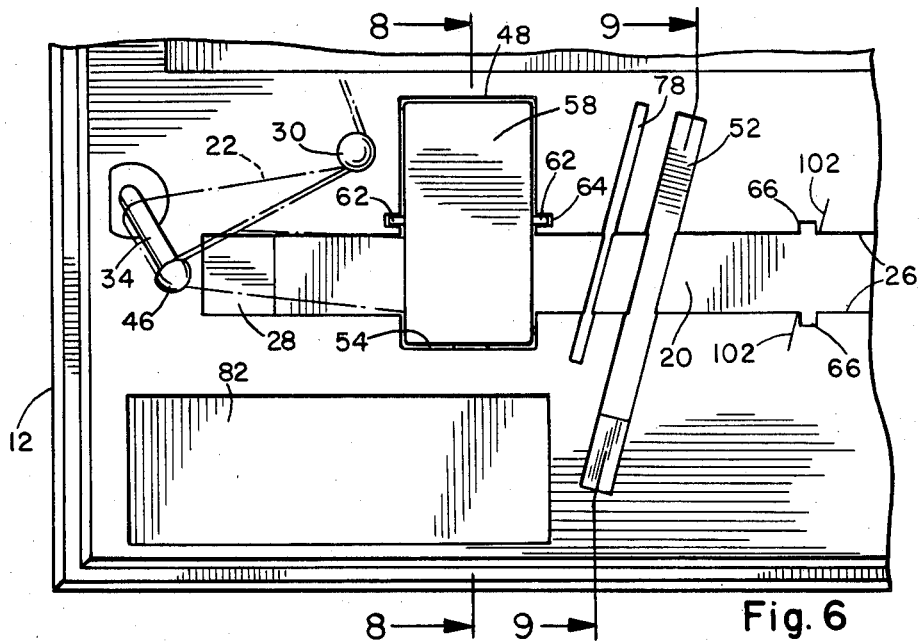
FIG. 6 is an enlarged top plan view of a portion of the preferred embodiment as illustrated in FIG. 4.

As best seen in FIGS. 4 and 7, the tape must change directions from a vertical plane orientation to an angular orientation so that the tape can later be held in a horizontal plane orientation within the recess by clasp means hereafter described. As illustrated in FIG. 7, the first guide posts 30 are spaced apart a distance less than the second guide posts 34. The first guide posts 30 are also positioned slightly inward of the corresponding feed openings of the cassette as illustrated in FIG. 6. The second guide posts 34 preferably extend at an angle of approximately forty-five degrees with respect to the horizontal plane of the base. As illustrated in FIG. 4, the second guide posts 34 preferably extend roughly toward a point located forward of the frontal edge 36 of the base.

The base of the apparatus is formed with four holes 38, 40, 42 and 44 (FIG. 1) for slidably receiving the lower ends of the guide posts 30 and 34. These holes are defined by sockets 45 (FIG. 7) molded into the underside of the base. The holes and the lower ends of the guide posts are conformably shaped so that the posts can only be inserted into the correct holes in the correct orientations illustrated in FIG. 2 to insure that the tape from the cartridge will properly feed through the recess. The guide posts are illustrated in their storage locations in FIG. 1 and their shapes are visible in this view.

In particular, the lower ends of the first guide posts 30 are cylindrical and the holes 38 and 40 which receive these lower ends are also cylindrical and dimensioned for a tight fit. The lower end of the left guide post 34 in FIG. 2 has a lower end comprising a truncated cylinder which fits into the hole 42 (FIG. 1) which is similarly shaped and dimensioned to provide a tight fit. The flat side of the hole is positioned so that the intermediate portion of this guide post which contacts the tape points inwardly as previously described and as illustrated in the drawings. Similarly, the lower end of the right guide post 34 illustrated in FIG. 2 has a cylindrical portion and a key portion on one side which fits into the hole 44 which is similarly shaped and dimensioned for a tight fit. The key portion of this hole is located so that the intermediate portion of this guide post which contacts the tape points inwardly as previously described and as illustrated in the drawings. It will thus be understood that the left guide post 34 can only fit into the hole 42 and the right guide post 34 can only fit into the hole 44. The first guide posts 30 can only fit into the holes 38 and 40. Thus, the tape can be fed from the feed openings of the cassette around inner portions of the first guide posts which face each other and then around outer portions of the second guide posts 34 which face away from each other and then through the recesses 20. Each of the guide posts has an enlarged portion 46 (FIG. 6) at its upper end for preventing the tape from sliding over the upper end of the post.

The apparatus further includes clasp means mounted on the base for movement to a closed position to hold the tape in horizontal alignment through the recess 20 and for movement to an open position to allow the tape to be removed from the recess. Specifically, the base 12 is formed with a pair of spaced apart, box-shaped rectangular openings 48 and 50 (FIGS. 2 and 8). The openings 48 and 50 are defined by box-shaped projections 51 (FIG. 7) molded into the underside of the base. These openings are positioned between the channel 16 and the recess 18 and are located on either side of a groove 52 which extends across the recess. A pair of rectangular depressions 54 and 56 (FIGS. 2 and 8) are also formed in the base 12 along side the recess 20 opposite corresponding ones of the box-shaped openings 48 and 50. These depressions have flat bottom walls which are at the same level and merge into the bottom wall of the recess 20.

A pair of rectangular panels 58 and 60 (FIG. 4) are each hingedly mounted to the base so that one end thereof can pivot within one of the rectangular openings. The other end of each panel can be swung into a closed position in which it rests within the corresponding rectangular depression as illustrated in FIG. 8. When the tape 22 has been fed through the recess 20, the panels 58 and 60 can be swung into closed positions as illustrated in FIG. 4 to clamp the tape in the recess. Each of the panels has pins 62 (FIG. 6) which project from opposite sides thereof and rotate within detents 64 formed within the base 12. The forward edge of each panel has an enlarged portion 63a (FIG. 8) which engages a clip portion 63b on the sidewall of the recess to provide a latch mechanism.

A pair of opposing detents 66 (FIGS. 2 and 10) are formed in the base in the side walls of the recess 20, between the rectangular panels 58 and 60. These detents are provided for receiving and guiding the side edges of a splicing key 68 (FIG. 12) manually inserted to depress a splicing tab 70 onto abutting cut ends of the tape as illustrated in FIG. 11.

The groove 52 (FIGS. 2 and 6) formed in the base extends diagonally across the recess 20. The groove is dimensioned to receive and guide the lower blade of a pair of scissors 72 (FIG. 9) manually operated to slice through the tape in the recess. The recess 52 is defined by a cup-like projection 74 (FIG. 7) integrally formed in the underside of the base 12. As best seen in FIG. 9, this cup-like projection 74 has an inclined end wall 76 to guide the scissors blade.

The base further has a slot 78 (FIG. 1) formed therein and extending diagonally across the recess 20 adjacent and parallel to the groove 52. The slot is dimensioned for receiving and guiding a razor (not illustrated) manually moved therethrough to slice the tape in the recess. The razor may be used instead of the scissors to slice the tape. The razor slot 78 is also defined by a cup-like projection 80 (FIG. 7) integrally formed in the underside of the base.

The base 12 is preferably mounted with a plurality of receptacles for receiving and holding various accessories. These receptacles are each defined by conformably shaped projections integrally molded in the underside of the base a 12. Rectangular receptacles 82 and 84 (FIG. 2) are provided at the front corners of the base for holding items such as splicing tabs, the splicing key 68 and the removed guide posts 30 and 34 as illustrated in FIG. 1. A receptacle 86 (FIG. 2) is also provided for receiving and holding a PHILLIPS screwdriver 88 (FIG. 1). The receptacle 86 has an enlarged portion for holding the handle and an enlarged portion near the tip of the screwdriver. The fingers can be inserted into the enlarged portion near the tip of the screwdriver in order to grasp the same. The enlarged portions of the receptacle 86 are joined by a narrow portion through which the shaft of the screwdriver extends. Another conformably shaped recess 90 (FIG. 2) is provided for receiving and holding the scissors 72 (FIG. 1). The receptacles 86 and 90 are formed behind the channel 16 under the portion of the base which is covered by a cassette when the same is mounted on the base as illustrated in FIG. 4.

A round receptacle 92 (FIG. 2) is formed in the rear left corner of the base and holds a knob 94 (FIG. 1). The knob may be removed from the receptacle 92 and inserted into a hub of either one of the reels of the cassette as illustrated in FIG. 4. The portion of the knob which is inserted into the hub has key portions (not illustrated) for engaging ribs in the hub to provide a positive driving connection. The knob may be rotated to feed the tape from the cassette around the guide posts. A generally rectangular receptacle 96 (FIG. 2) is formed in the rear portion of the base for holding a single-edge razor (not illustrated). The end portions 98 of the bottom wall of the receptacle 96 are inclined downwardly. Thus, a person can push on either end of the razor to cause the other end to tilt up so that the razor can be grasped and removed for use.

Figure 5:
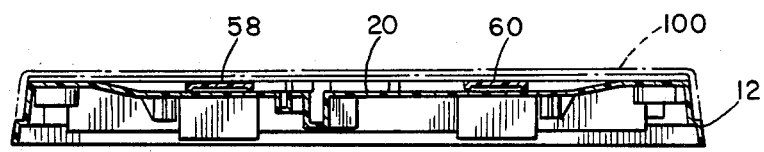
FIG. 5 is a sectional view of the preferred embodiment taken along line 5—5 of FIG. 1.

As best seen in FIGS. 4 and 5, the two tiered side edges of the base are upwardly and inwardly inclined. This permits a plastic cover 100 (FIG. 5) to be tightly fit over the base when no cassette is present, the guide posts have been removed, and the panels 58 and 60 are closed. The cover 100 is preferably made of clear plastic so that the nature of the device can be readily observed and the availability of the required accessories can be verified. The apparatus thus functions as a kit, with the cover serving to retain all of the accessories in their corresponding receptacles ready for use should a cassette require tape splicing.

Having described the mechanism construction of the preferred embodiment of my magnetic tape splicing apparatus, the manner in which it is utilized can now be described. The apparatus is retrieved from its storage location, along with the video cassette having the stretched, wrinkled or broken magnetic tape which needs to be spliced. The cover 100 is removed and the guide posts 30 and 34 are inserted in their proper locations. The panels 58 and 60 are opened. Using a pencil, screwdriver or other implement, the latch mechanism of the video cassette is depressed so that the door 18 thereof can be fully opened. The cassette is then placed in a horizontal position on top of the base as illustrated in FIG. 4 with the door porjection downwardly into the channel 16. In the event that the magnetic tape is jammed within the cassette, it may be necessary to utilize the screwdriver to disassemble the cassette and pull the tape clean prior to mounting the cassette on the base. The cassette should be reassembled after the jam has been fixed.

Once the cassette has been mounted on the base as illustrated in FIG. 4, the repair procedure depends upon whether or not the tape has been broken. Where the tape has not been broken, the procedure is as follows. The tape is first threaded around the guide posts as illustrated in FIG. 4, 6 and 7. The top of the base preferably has arrows (not illustrated) to guide the person in threading the tape. The knob 94 is then inserted into the appropriate hub of the cassette and turned until the good portion of the tape just prior to the beginning of the wrinkled or damaged segment is positioned over the groove 52 or the slot 78. The doors 58 and 60 are then closed to secure the tape in position and either the scissors or a razor is used to slice the tape (FIG. 9). The doors are then opened (FIG. 2) and the wrinkled portion of the tape is pulled through the recess until the good portion of the tape adjacent the other end of the wrinkled portion is above the groove 52 or slot 78. Another cut is then made to remove the entire segment of wrinkled tape.

With the panels 58 and 60 opened, the two cut ends 22a and 22b of the tape are slid together in the recess 20 so that their ends abut and are in alignment with diagonal marks 102 as illustrated in FIG. 10. These marks are formed in the base 12 adjacent the detents 66. A splicing tab 70 (FIG. 11) is then laid over the ends 20a and 20b of the tape with the adhesive sheet 104 on top and the pair of peel away backing layers 106 folded back underneath the adhesive layer. The user presses down on the splicing key so that its wedge shaped lower end 108 presses the adhesive sheet 104 against the cut ends 22a and 22b of the tape. The backing layers 106 are then pulled away and the adhesive sheet is pressed against the tape ends 22a and 22b over its entire length to thereby splice the tape.

When the tape which is to be repaired has been broken, the two ends of the tape may be wound around the guide posts and fed through the recess in overlapping fashion. The panels 58 and 60 may then be closed to clamp the tape ends in position. Thereafter, with the ends of the tape overlapping, a single cut through either groove 52 or the slot 78 will simultaneously cut both tape ends to provide matching angular cuts. These precisely cut ends may now be spliced using a splicing tab as indicated above. This method of cutting both ends of the tape simultaneously to insure that they can be placed in precise abutment as illustrated in FIG. 10 may also be used in the procedure described above where the tape has not been broken, after a wrinkled segment has been removed.

Having described a preferred embodiment of my apparatus for splicing magnetic tape, it should be apparent to those skilled in the art that my invention may be modified in arrangement and detail. Accordingly, the protection afforded my invention should be limited only in accordance with the scope of the following claims.

I claim:

1. An apparatus for splicing magnetic tape wound between a pair of reels in a cassette having a door along one side edge which swings open to expose a segment of the tape for engagement by magnetic head, comprising:
   a base for horizontally supporting the cassette;
   door retention means on the base for holding the cassette door open including an upwardly opening, elongate channel formed in the base;
   track means on the base for aligning a length of the tape unwound from the cassette in a straight segment with the tape extending in a horizontal plane;
   guide means on the base for feeding tape from one reel of the cassette to the track means and back to the other reel of the cassette;
   clasp means mounted on the base for movement to a closed position to hold the tape in horizontal alignment in the track means and for movement to an open position to allow the tape to be moved in the track means; and
   a groove extending across the track means for permitting a cuting implement to slice through the length of tape aligned in the track means.

2. An apparatus for splicing magnetic tape according to claim 1 wherein the track means comprises an upwardly opening, elongate recess formed in the base.

3. An apparatus for splicing magnetic tape according to claim 1 wherein the clasp means comprises a pair of panels hingedly mounted to the base and adapted to swing to closed positions over the tape within the track means on opposite sides of the groove.

4. An apparatus for splicing magnetic tape according to claim 1 wherein the groove is dimensioned to receive and guide the lower blade of a pair of scissors manually operated to slice through the tape.

5. An apparatus for splicing magnetic tape according to claim 4 and further comprising a slot extending across the track means adjacent the groove and dimensioned for receiving and guiding a razor manually moved through the slot to slice through the length of tape aligned in the track means.

6. An apparatus for splicing magnetic tape according to claim 1 wherein the guide means comprises a plurality of posts extending upwardly from the base between the door retention means and the track means.

7. An apparatus for splicing magnetic tape according to claim 6 wherein the plurality of posts includes a first pair of posts each of which extends vertically from the base adjacent a feed opening of the cassette, and a second pair of posts each of which extends upwardly from the base at an angle at a location adjacent a corresponding end of the track means.

8. An apparatus for splicing magnetic tape according to claim 7 wherein the first pair of posts are spaced apart a distance less than the second pair of posts so that the tape can be fed from the feed openings of the cassette around inner portions of the first posts which face each other and around outer portions of the second posts which face away from each other.

9. An apparatus for splicing magnetic tape according to claim 1 and further comprising a first receptacle formed in the base for holding accessories, a second receptacle formed in the base and conformably shaped for holding a screwdriver and a third receptacle formed in the base and conformably shaped for holding a pair of scissors.

10. An apparatus for splicing magnetic tape according to claim 6 wherein the posts are removable.

11. An apparatus for splicing magnetic tape according to claim 10 wherein the base is formed with a plurality of holes for removably receiving the lower ends of the posts, and further wherein the lower ends of the posts and the holes are conformably shaped so that the posts can only be inserted into the correct ones of the holes in the correct orientations for properly feeding the tape to and from the track means.

12. An apparatus for splicing magnetic tape according to claim 1 and further comprising a receptacle formed in the base for holding a knob adapted to be removed from the receptacle and inserted into a hub of either one of the reels of the cassette for permitting the reels to be manually rotated to feed the tape from the cassette.

13. An apparatus for splicing magnetic tape according to claim 1 and further comprising a removable lid for removably covering the base.

14. An apparatus for splicing magnetic tape wound between a pair of reels within a cassette having a door along one side edge which swings open to expose a segment of the tape for engagement by a magnetic head, comprising:

a base for horizontally supporting the cassette so that the tape normally extends between the reels in a vertical plane;

an upwardly opening, elongate channel formed in the base for receiving and holding the cassette door in its open position;

an upwardly opening, elongate recess formed in the base and extending parallel to the channel, the recess being dimensioned for receiving and aligning a length of the tape unwound from the cassette in a straight segment with the tape extending in a horizontal plane;

a first pair of removable guide posts extending vertically from the base adjacent corresponding feed openings of the cassette and a second pair of removable guide posts extending upwardly at an angle from the base at opposite ends of the recess, the posts being spaced so that the tape can be wound thereabout and fed through the recess;

a pair of clasps hingedly mounted in openings formed in the base and adapted to swing to closed positions in which they overlie the tape in the recess to hold the same in horizontal alignment and to open positions to permit the tape to be moved in the recess; and a groove formed in the base and extending across the recess for permitting a cutting implement to slice through the length of tape aligned in the recess.

15. An apparatus for splicing magnetic tape according to claim 14 wherein the base is a unitary, molded piece of plastic.

16. An apparatus for splicing magnetic tape according to claim 14 wherein the base is rectangular and further includes:

a first receptacle formed in a front left corner of the base;

a second receptacle formed in a front right corner of the base;

a third receptacle formed in a rear portion of the base and conformably shaped for holding a screwdriver;

a fourth receptacle formed in the rear portion of the base and conformably shaped for holding a pair of scissors;

a fifth receptacle formed in the rear portion of the base for holding a knob adapted to be removed from the fifth receptacle and inserted into a hub of either one of the reels of the cassette for permitting the reels to be manually rotated to feed the tape from the cassette; and a sixth receptacle formed in the rear portion of the base for holding a razor adapted to be removed and used to slice the tape in the recess.

17. An apparatus for splicing magnetic tape according to claim 14 wherein the base is formed with a plurality of holes for receiving the lower ends of the posts, and further wherein the lower ends of the posts and the holes are conformedly shaped so that the posts can only be inserted into the correct ones of the holes in the correct orientations for properly feeding the tape to and form the recess.

18. An apparatus for splicing magnetic tape according to claim 14 and further comprising a pair of detents formed in a pair of opposite side walls of the recess for receiving and guiding a splicing key vertically depressed against a splicing tab on top of the tape in the recess.

19. An apparatus for splicing magnetic tape wound between a pair of reels in a cassette having a spring biased door along one side edge which may be swung open to expose a segment of the tape which extends between a pair of feed openings, comprising:

a unitary molded rectangular base for horizontally supporting the cassette so that rotational axes of the reels extend vertically;

an upwardly opening, elongated channel formed in the medial portion of the base and being dimensioned for receiving and holding the cassette door in its open position;

an upwardly opening, elongate recess formed in the base extending parallel to and spaced from the channel, the recess having a width slighly greater than the width of the tape, a flat bottom wall, a pair of straight side walls and a pair of inclined end walls;

a first pair of removable guide posts each extending vertically from the base adjacent a feed opening of the cassette and a second pair of removable guide posts each extending upwardly at an angle from the base toward an end of the recess, the second pair of posts being spaced farther apart that the first pair of posts and the posts being located so that the tape can be fed from the feed openings of the cassette around inner portions of the first posts which face each other and around outer portions of the second posts which face away from each other to and from the ends of the recess, the base being formed with a plurality of holes for slidably receiving the lower ends of the posts, the holes and the lower ends of the posts being conformably shaped so that the posts can only be inserted into the correct orientations for properly feeding the tape to and from the recess, the upper ends of the posts having enlarged portions for preventing the tape from sliding over the upper ends of the posts;

a groove formed in the base and extending diagonally across the recess substantially intermediate its length, the groove being dimensioned to receive and guide the lower blade of a pair of scissors manually operated to slice through the tape in the recess;

a slot formed in the base and extending diagonally across the recess adjacent and a parallel to the groove, the slot being dimensioned for receiving and guiding a razor slot being dimensioned for receiving and guiding a razor manually moved therethrough to slice the tape in the recess;

a pair of rectangular openings formed in the base on one side of the recess on either side of the groove;

a pair of rectangular depressions formed in the base on the other side of the recess, each being opposite a coresponding one of the rectangular openings and having a flat bottom wall which is at the same level and merges into the bottom wall of the recess;

clasp means for holding the tape in horizontal alignment in the recess, including a pair of rectangular panels, and means for hingedly mounting each panel so that one end thereof can pivot within one of the rectangular openings and the other end of the panel can be swung to a closed position in which it rests within the corresponding rectangular depression to clamp the tape in the recess;

a pair of opposing detents formed in the base in the side walls of the recess, between the pair of rectangular panels for receiving and guiding the side edges of a splicing key manually inserted to depress a splicing tab onto abutting cut ends of the tape;

a first accessory receptacle formed in the base at one corner of the base adjacent the recess;

a second accessory receptacle formed in the base at the other corner of the base adjacent the recess;

a third receptacle formed in the base in the areas covered by the cassette and conformably shaped for holding a screwdriver;

a fourth receptacle formed in the base adjacent the third receptacle and conformably shaped for holding a pair of scissors;

a fifth receptacle formed in the base for holding a knob adapted to be removed and inserted into a hub of either one of the reels of the cassette for permitting the reels to be manually rotated to feed the tape from the cassette; and a sixth receptacle formed in the base for storing a razor.

* * * * *